(12) United States Patent
Blanc et al.

(10) Patent No.: US 6,691,830 B2
(45) Date of Patent: Feb. 17, 2004

(54) DEVICE FOR LUBRICATING A POWER GEARBOX WITH A VARIABLE ORIENTATION, PARTICULARLY FOR A CONVERTIBLE TILT-ROTOR AIRCRAFT

(75) Inventors: Maurice Blanc, Eguilles (FR); Lionel Thomassey, Fos-sur-Mer (FR)

(73) Assignee: Eurocopter, Marignane (FR)

( * ) Notice: Subject to any disclaimer, the term of this patent is extended or adjusted under 35 U.S.C. 154(b) by 0 days.

(21) Appl. No.: 09/960,392

(22) Filed: Sep. 24, 2001

(65) Prior Publication Data
US 2002/0036119 A1 Mar. 28, 2002

(30) Foreign Application Priority Data
Sep. 25, 2000 (FR) .............................................. 00 12154

(51) Int. Cl.⁷ ............................. F01M 7/00; B64C 15/12
(52) U.S. Cl. .................... 184/6.2; 244/12.4; 244/17.25; 244/56
(58) Field of Search .......................... 184/6.2; 244/12.4, 244/17.25, 56; 415/72

(56) References Cited

U.S. PATENT DOCUMENTS

| | | | |
|---|---|---|---|
| 3,075,690 A | | 1/1963 | Luenberger |
| 3,870,433 A | * | 3/1975 | Raikov et al. ................. 415/72 |
| 4,099,687 A | | 7/1978 | Roberts et al. ............. 244/7 R |
| 4,591,322 A | * | 5/1986 | Ono et al. ..................... 418/48 |
| 4,820,212 A | * | 4/1989 | McElroy et al. .............. 440/88 |
| 5,400,889 A | * | 3/1995 | Bell et al. ..................... 184/6.2 |
| 6,260,793 B1 | * | 7/2001 | Balayn et al. ................ 244/56 |

FOREIGN PATENT DOCUMENTS

DE 1903069 11/1970

* cited by examiner

*Primary Examiner*—David A. Bucci
*Assistant Examiner*—Brad Van Pelt
(74) *Attorney, Agent, or Firm*—Steven, Davis, Miller & Mosher, LLP

(57) ABSTRACT

A device for lubricating a power gearbox having a variable orientation and a closed space has a lubricating unit that supplies lubricant to at least one element of the gearbox, which needs to be lubricated. A collecting reservoir collects lubricant from the closed space. A drain screw chamber, within the closed space, has a number of orifices disposed between different zones of the closed space and the drain screw chamber for passing lubricant there between. At least one rotary drain screw, which is produced in the form of an Archimedean screw, is disposed in the drain screw chamber to convey the lubricant from the drain screw chamber to the collecting reservoir. A drive unit drives the drain screw in rotation for conveying the lubricant. The orifices open respectively different zones of the closed space to the drain screw chamber such that the drain screw chamber can always collect lubricant from the different zones regardless of the orientation of the gearbox.

6 Claims, 3 Drawing Sheets

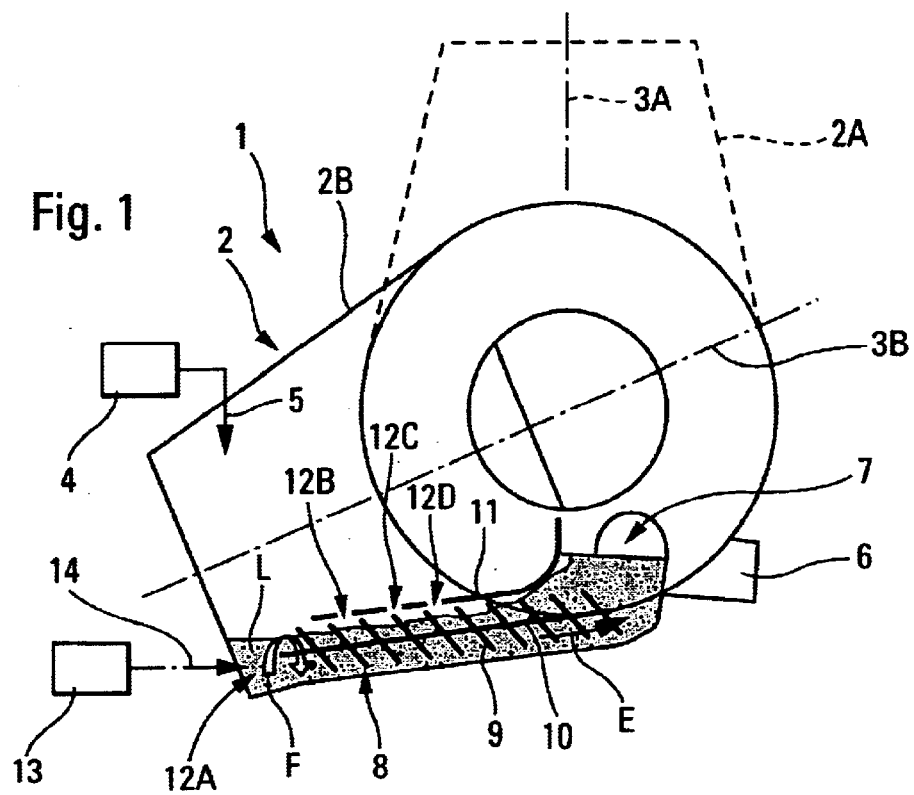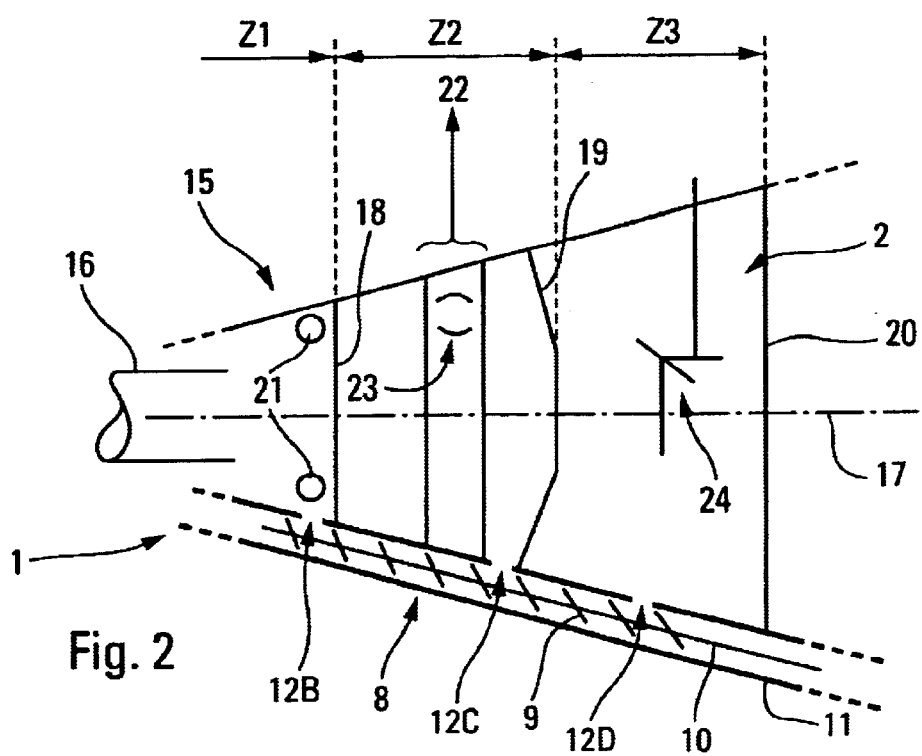

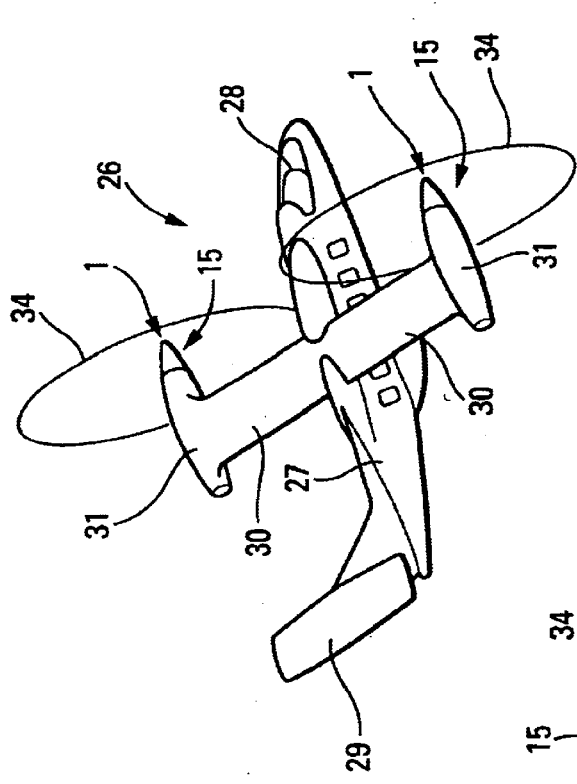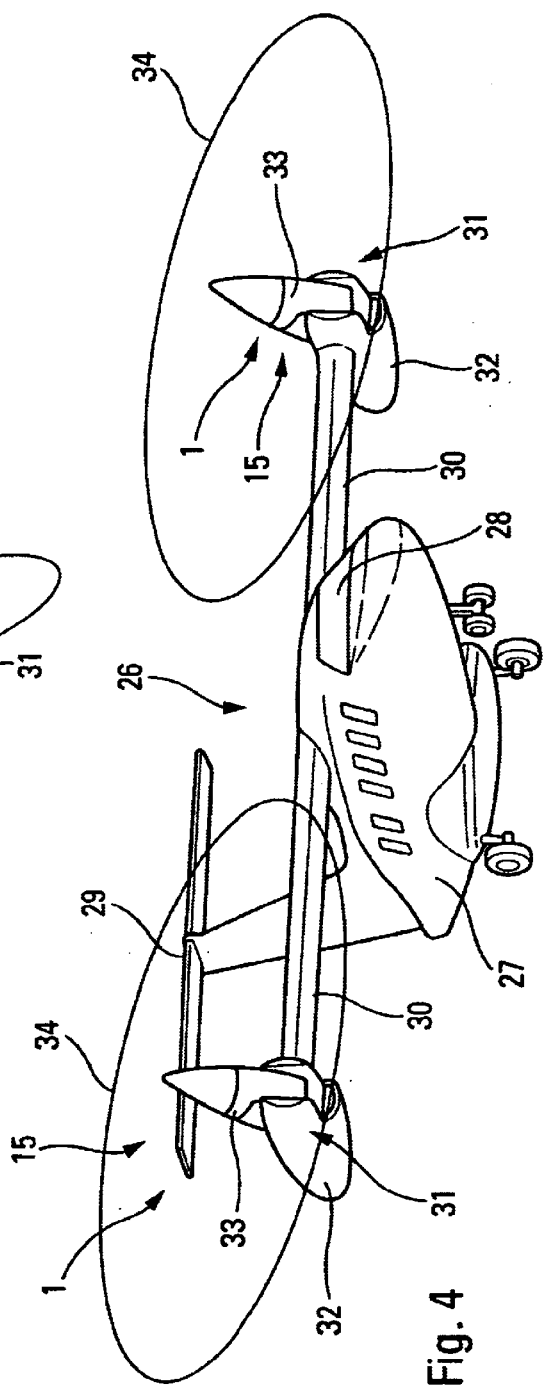

DEVICE FOR LUBRICATING A POWER GEARBOX WITH A VARIABLE ORIENTATION, PARTICULARLY FOR A CONVERTIBLE TILT-ROTOR AIRCRAFT

The present invention relates to a device for lubricating a power gearbox having a variable orientation particularly for a convertible tilt-rotor aircraft.

In general, the device for lubricating a gearbox comprises, in particular:

lubricating means, for example pumps, which supply lubricant to at least one element of said gearbox (gears, bearings, etc) that needs to be lubricated; and a collecting reservoir which collects the lubricant from said gearbox.

It is known that, in the case of a customary gearbox which has a constant orientation during time with respect to the elements and structure around it, for example the main gearbox of a helicopter, lubricant is returned to the collecting reservoir generally by no particular means, simply under the effect of gravity, the lubricant running down along the walls of the gearbox and being collected directly by said reservoir, an opening into which is provided in the lowermost part of the gearbox.

Of course, such a method of collection is possible only when the gearbox has a stable orientation so that the opening into the reservoir is then always situated vertically at the bottom of the gearbox, in the region where the lubricant accumulates.

By contrast, when the orientation of the gearbox varies, the region in which the lubricant accumulates in the gearbox also varies and tends to lie away from the entry into the collecting reservoir, so that this method of collection is then no longer appropriate.

This is why it is necessary to provide special-purpose collecting means in variable-orientation gearboxes, such as a main gearbox of an aircraft of the convertible tilt-rotor type. In an aircraft such as this which has vertical take-off in the manner of a helicopter, the rotors then acting as rotary wings, and which performs cruising flight in the manner of an airplane, the rotors operating in this case as propellers, there is generally provided, for transmitting power between each rotor and the motor associated with it, a transmission system comprising a tilting reduction assembly:

which is produced in the form of a gearbox;

which is connected to a non-tilting reduction assembly connected to a shaft of said motor; and which drives said rotor.

In general, by way of special-purpose collecting means, use is made of a pump which pumps the lubricant from an accumulating region to the lubricating reservoir. Since, in this case (variable-orientation gearbox), there are at least two different accumulating regions, it is necessary to provide at least two pumps per transmission system (one for the airplane mode and one for the helicopter mode, in a convertible aircraft), and this leads to a significant increase in the mass and to reduction in reliability.

In addition, such a transmission system is complex and is difficult to maintain.

Furthermore, it is known that conventional pumps which are, for example, used in the gearboxes of a helicopter, cannot operate dry without sustaining damage. This is why the use of such pumps on a convertible aircraft poses serious reliability problems because in certain flight configurations, such as the helicopter mode, for example, the pumps designed for draining in the airplane mode are not supplied with lubricant or are supplied only intermittently.

It is an object of the present invention to overcome these drawbacks. The invention relates to a simple, lightweight and reliable device for lubricating a power gearbox which has variable orientation, particularly of a convertible tilt-rotor aircraft.

To this end, according to the invention, said lubricating device of the type comprising:

lubricating means for supplying lubricant to at least one element that needs to be lubricated of said gearbox comprising a closed space; and a collecting reservoir for collecting the lubricant from said closed space, is notable in that it additionally comprises:

at least one rotary drain screw, which is produced in the form of an Archimedian screw, equipped with a number of orifices and which is arranged in said closed space to convey lubricant from said closed space to said collecting reservoir; and drive means for driving said drain screw in rotation, and in that said orifices are made in the drain screw in an arrangement such that said drain screw can collect the lubricant from said closed space regardless of the orientation of said gearbox.

Thus, as use is simply made of an Archimedian screw for collecting the lubricant, said lubricating device becomes simpler to produce and simpler to maintain, and its mass and bulk are reduced.

In addition, unlike the aforementioned solutions, the Archimedian screw which, in the known fashion, comprises a helix rotating about its axis in a channel and which causes the lubricant to move along, can run dry, with an air/oil mixture, and can do so without the risk of cavitation.

Furthermore, by virtue of the invention, it is possible to use a very simple system for transmitting movement to the drain screw and for guiding its rotation. In particular:

the drain screw can take its movement (from the drive means) by way of a belt or a chain. As a preference, however, it does so by means of gears made of synthetic material, which have the advantage of being lightweight; and guidance can be by means of plane bearings rather than rolling bearings.

Furthermore, advantageously, said drain screw is at least partially made of synthetic material, which makes it possible to reduce the mass and wear still further.

The present invention also relates to a transmission system for the transmission of power between a drive motor and a tilt rotor, which is capable of tilting between a first position in which it is capable of operating as a rotary wing, and a second position in which it is capable of operating as a propeller, said transmission system comprising a tilting reduction assembly:

which is produced in the form of a gearbox;

which is connected to a non-tilting reduction assembly connected to a shaft of said motor; and which drives said rotor.

According to the invention, this transmission system is noteworthy in that said gearbox of the tilting reduction assembly comprises at least one lubricating device such as the aforementioned one according to the invention.

Furthermore, the present invention also relates to a convertible tilt-rotor aircraft capable of operating in airplane mode and in helicopter mode and comprising at least one fuselage, a fixed wing structure comprising at least two wings extending laterally one on each side of said fuselage and, in helicopter mode, a rotary wing structure comprising at least two rotors which in airplane mode act as propellers and each of which is mounted so that it can tilt on a respective fixed wing and is connected, by a respective transmission system, to a respective motor supported by the corresponding wing. According to the invention, at least one of said transmission systems is the aforementioned one according to the invention.

The figures of the appended drawings make it easy to understand how the invention may be embodied. In these figures, identical references denote similar elements.

FIG. 1 schematically illustrates a lubricating device according to the invention.

FIG. 2 schematically illustrates the arrangement of an Archimedian screw in a main gearbox of a rotor.

FIGS. 3 and 4 are schematic perspective views of a convertible aircraft in airplane mode and in helicopter mode, respectively.

Figure 5:
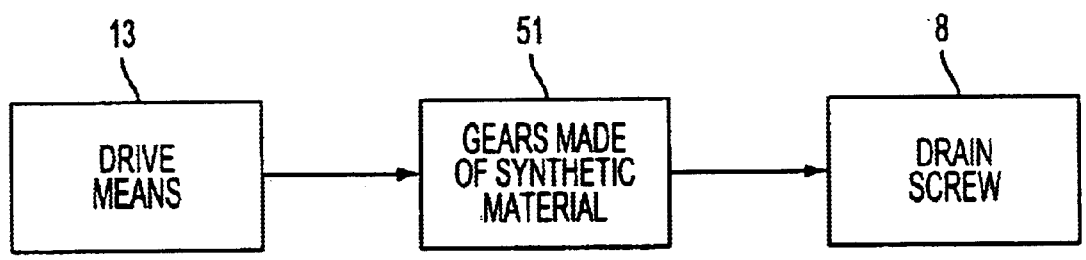
FIG. 5 illustrates a driving apparatus for the Archimedean screw.

The lubricating device 1 according to the invention and depicted schematically in FIG. 1 is intended to lubricate a power gearbox 2 which has a variable orientation, that is to say which can, in succession, adopt at least two different orientations or positions, namely, for example:

a "vertical" position 2A depicted in broken line in FIG. 1, for which the longitudinal axis of the gearbox 2 is arranged along an axis 3A; and an "inclined" position 2B depicted in continuous line, for which said longitudinal axis is arranged along an axis 3B different than the axis 3A.

Said lubricating device 1 is of the known type comprising:

customary lubricating means 4, preferably lubricating pumps, which supply lubricant, as illustrated by an arrow 5, to at least one element to be lubricated (not depicted), for example gearing or a bearing, of said gearbox 2; and a collecting reservoir 6 for collecting lubricant from said gearbox 2 and which comprises a closed space. Said lubricant enters said reservoir 6 through an inlet opening 7.

In general, the lubricating means 4 is supplied with lubricant from said collecting reservoir 6. However, it is also conceivable for said lubricating means 4 to be fed from another reservoir, not depicted.

According to the invention, said lubricating device 1 additionally comprises:

at least one drain screw 8 which is produced in the form of an Archimedian screw. This drain screw 8:

comprises a rotary helix 9 which rotates about its axis 10 in a channel 11 and causes the lubricant L to move along in the direction illustrated by an arrow E;

is arranged in the gearbox 2 in such a way as to convey the lubricant L into the collecting reservoir 6 via the opening 7; and is provided with a number of openings (or orifices) 12A, 12B, 12C, 12D which are made in an arrangement such that said drain screw 8 can collect lubricant L from the gearbox 2 regardless of the orientation or position 2A, 2B thereof. In the position 2B depicted in FIG. 1, the lubricant L essentially enters the channel 11 via the opening 12A; and drive means 13 for driving the rotation of the screw 8 as illustrated by an arrow F. These drive means 13 may be customary drive means specific to the present invention, such as an electric motor, for example. As a preference, however, they are moving parts, for example a power shaft, of said gearbox 2 or of an element arranged near to the latter.

Thus, by virtue of the invention, there is obtained a lubricating device 1, which is simple to produce, and for which:

maintenance is easier and simplified;

the mass and bulk are reduced; and the reliability is better.

According to the invention, movement may be taken from the drive means 13, this taking of movement being illustrated by a link 14, by means of a belt or of a chain. As a preference, however, use is made of gears 51 made of synthetic material, as illustrated in FIG. 5, which makes it possible to reduce the mass and the wear. Drive means 13 acts on drain screw 8 by means of gears 51 made of synthetic material.

In order to reduce the mass of the lubricating device 1 still further, it is also possible to make the drain screw 8 at least in part, particularly its helix 9, of synthetic material, which additionally makes it possible to reduce wear.

Furthermore, rotational guidance of the helix 9 may be achieved advantageously by means of plane bearings, not depicted, in place of rolling bearings.

It will be noted that, when the gearbox 2 is in the vertical position 2A, the lubricant can be collected, at least in part, directly under the effect of gravity, since the opening 7 into the collecting reservoir 6 is then in the region where the lubricant accumulates.

FIG. 2 schematically and partially depicts a preferred embodiment of a power transmission system 15 according to the invention and comprising the gearbox 2 which is associated with a rotor, of which the mast 16, of axis 17, has been partially depicted, this preferably being a tilt rotor. Said transmission system 15 thus transmits power between a customary drive motor, not depicted, and said rotor.

The gearbox 2 is split, as illustrated in FIG. 2, into zones Z1, Z2 and Z3 which are separated by partitions 18, 19 and 20 that separate the zones.

Said zones Z1, Z2 and Z3 contain elements that are to be lubricated and, in particular, respectively:

rolling bearings 21 of the rotor mast 16;

an epicyclic gear set 22 comprising, in particular, planet pinions 23; and a spiro-conical pair 24.

The Archimedian screw 8 comprises at least one orifice 12B, 12C, 12D facing each of said zones Z1 to Z3.

For example, the orifice 12B collects lubricant from the zone Z1, which prevents this lubricant, which may be contaminated (filings, etc.) from entering zone Z2. The same is true of the orifice 12C associated with the zone Z2 and with the orifice 12D associated with the zone Z3.

The orifices 12A to 12D provided on the drain screw 8 may be fitted with the customary magnetic plugs, not depicted, intended to collect metallic contaminants found in the lubricant.

In the context of the present invention, the variable-orientation gearbox 2, lubricated by the lubricating device 1, can tilt either in full or in part.

As a preference, the transmission system 15 according to the invention and depicted partially in FIG. 2, is intended to transmit power between a drive motor and a tilt motor of the known type, capable of tilting between a first position in which it is capable of operating as a rotary wing, and a second position in which it is capable of operating as a propeller. Said transmission system 15 therefore comprises a tilting reduction assembly:

which corresponds to said power gearbox 2;

which is connected to a non-tilting reduction assembly, not depicted, and connected to a shaft of said drive motor, movement from said drive motor being transmitted to said tilting reduction assembly via said non-tilting reduction assembly; and which drives said rotor.

A tilt rotor such as this is provided, in particular, on a convertible aircraft 26 of customary type, depicted in FIGS. 3 and 4.

This convertible aircraft 26 comprises an airplane fuselage 27 with a pilot's seat 28 at the front and a T-shaped tail assembly 29 at the rear, and two fixed high wings 30 with zero backsweep and constant chord, with a engine 31 fixed via the rear part 32 at the end of each of the two wings 30 and extending laterally one on each side of the fuselage 27.

Each engine 31 comprises a front part 33 which is profiled and mounted so as to tilt with respect to the fixed rear part 32 of the engine 31, and therefore with respect to the corresponding wing 30.

A rotor 34 is mounted so that it can rotate in each tilting engine front part 33, and at the same time so that it can tilt with the corresponding engine front part 33. Each rotor 34 comprises a mast, not depicted, connected, for its rotational drive, via the transmission system 15, to a drive motor, not depicted, which is fixed in the rear part 32 of the corresponding engine 31.

Said convertible aircraft 26 is thus equipped with two tilt rotors 34, each of which can be tilted between a helicopter configuration (FIG. 4) in which each rotor 34 is driven about a more or less vertical axis of rotation so that the aircraft can operate in helicopter mode, essentially for take-off, and an airplane configuration (FIG. 3) in which each rotor 34 represents a propeller driven in rotation about an axis more or less aligned with the direction of flight, so that the aircraft can operate in airplane mode, essentially for cruising flight.

In consequence, by virtue of the invention, the main gearboxes 2 associated with said tilt rotors 34 can be lubricated in a simple, reliable and compact way, which lubrication is complicated and difficult to achieve because of the change in orientation, with respect to the stable structure of the aircraft 26, of said gearboxes 2 incorporated into the corresponding tilting nacelle front parts 33, depending on the various phases of flight of said aircraft 26.

What is claimed is:

1. A device for lubricating a power gearbox having a variable orientation and comprising a closed space, said lubricating device comprising:

lubricating means for supplying lubricant to at least one element of said gearbox that needs to be lubricated;

a collecting reservoir for collecting lubricant from said closed space;

at least one rotary drain screw member, which includes an Archimedean drain screw, equipped with a number of orifices and which is arranged in said closed space to convey lubricant from said closed space to said collecting reservoir, wherein said orifices are made in the drain screw member and are facing respectively different zones of said closed space such that said drain screw can always collect lubricant from said closed space regardless of the orientation of said gearbox; and drive means for driving said drain screw in rotation.

2. The lubricating device as claimed in claim 1, wherein said drain screw is at least partially made of synthetic material.

3. The lubricating device as claimed in claim 1, wherein said drive means act on said drain screw by means of gears made of synthetic material.

4. The lubricating device as claimed in claim 1, wherein said orifices are fitted with magnetic plugs, intended to collect metallic contaminants found in the lubricant.

5. A transmission system for the transmission of power between a drive motor and a tilt rotor, which is capable of tilting between a first position in which it is capable of operating as a rotary wing, and a second position in which it is capable of operating as a propeller, said transmission system comprising a tilting reduction assembly:

which is produced in the form of a gearbox;

which is connected to a non-tilting reduction assembly connected to a shaft of said motor; and which drives said rotor, wherein said gearbox of the tilting reduction assembly comprises at least one lubricating device as specified in claim 1.

6. A convertible tilt-rotor aircraft capable of operating in airplane mode and in helicopter mode and comprising at least one fuselage, a fixed wing structure comprising at least two wings extending laterally one on each side of said fuselage and, in helicopter mode, a rotary wing structure comprising at least two rotors which in airplane mode act as propellers and each of which is mounted so that it can tilt on a respective fixed wing and is connected, by a respective transmission system, to a respective motor supported by the corresponding wing, wherein at least one of said transmission systems is the one specified in claim 5.

* * * * *